(12) United States Patent
Meyer et al.

(10) Patent No.: US 6,752,864 B2
(45) Date of Patent: Jun. 22, 2004

(54) GRANULES BASED ON PYROGENICALLY PREPARED SILICON DIOXIDE DOPED WITH ALUMINUM OXIDE BY MEANS OF AN AEROSOL, METHOD OF PRODUCING SAME, AND USE THEREOF

(75) Inventors: Jürgen Meyer, Stockstadt (DE); Helmut Mangold, Rodenbach (DE); Peter Neugebauer, Offenbach (DE)

(73) Assignee: Degussa AG, Düsseldorf (DE)

( * ) Notice: Subject to any disclaimer, the term of this patent is extended or adjusted under 35 U.S.C. 154(b) by 113 days.

(21) Appl. No.: 10/141,347

(22) Filed: May 9, 2002

(65) Prior Publication Data

US 2003/0089279 A1 May 15, 2003

(30) Foreign Application Priority Data

May 17, 2001 (DE) .......................... 101 23 950

(51) Int. Cl.$^7$ .......................... C04B 14/04; C01B 33/12
(52) U.S. Cl. ............... 106/483; 106/287.1; 106/287.14; 106/287.17; 106/287.34; 423/335
(58) Field of Search .............. 106/483, 287.1, 106/287.17, 287.14, 287.34; 423/335

(56) References Cited

U.S. PATENT DOCUMENTS

| | | | |
|---|---|---|---|
| 5,776,240 A | | 7/1998 | Deller et al. |
| 6,592,970 B2 | * | 7/2003 | Ohta et al. .................. 428/195 |
| 6,613,300 B2 | * | 9/2003 | Mangold et al. ............. 423/278 |
| 2002/0061404 A1 | * | 5/2002 | Schubert et al. ............. 428/446 |
| 2002/0121156 A1 | * | 9/2002 | Menzel et al. ................ 75/255 |
| 2002/0168524 A1 | * | 11/2002 | Kerner et al. ............... 428/405 |
| 2002/0177311 A1 | * | 11/2002 | Schumacher et al. ....... 438/689 |
| 2003/0118499 A1 | * | 6/2003 | Scharfe et al. .............. 423/335 |
| 2003/0150838 A1 | * | 8/2003 | Lortz et al. ................... 216/89 |
| 2003/0185739 A1 | * | 10/2003 | Mangold et al. ............. 423/335 |

FOREIGN PATENT DOCUMENTS

| | | | | |
|---|---|---|---|---|
| DE | 1 209 108 | | 5/1969 | |
| DE | 36 11 449 A1 | | 10/1987 | |
| DE | 19847161 A1 | * | 10/1998 | ............. C09C/3/00 |
| EP | 0 725 037 A1 | | 8/1996 | |
| EP | 0 995 718 A1 | | 4/2000 | |

OTHER PUBLICATIONS

Official Action of the German Patent Office, dated Feb. 13, 2002, for German Patent Application No. 101 23 950.5, 2 pps.

European Search Report, dated Aug. 27, 2002, for European Patent Application No. 02006055.4, 3 pps.

* cited by examiner

Primary Examiner—Mark L. Bell
Assistant Examiner—Patricia L. Hailey
(74) Attorney, Agent, or Firm—Smith, Gambrell & Russell, LLP

(57) ABSTRACT

Granules based on pyrogenically prepared silicon dioxide doped with aluminum oxide by means of an aerosol, which granules have the characteristic data:

| | |
|---|---|
| mean particle diameter: | from 10 to 150 $\mu$m |
| BET surface area: | from 25 to 100 m$^2$/g |
| pH value: | from 3 to 6 |
| tamped density: | from 400 to 1200 g/l |

They are produced by dispersing in water pyrogenically prepared silicon dioxide doped with aluminum oxide by means of an aerosol, spray drying the dispersion, and optionally carrying out tempering and/or silanization. In the silanized form, the granules have the following characteristic data:

| | |
|---|---|
| mean particle diameter: | from 10 to 160 $\mu$m |
| BET surface area: | from 15 to 100 m$^2$/g |
| pH value: | from 3 to 9 |
| tamped density: | from 400 to 1200 g/l |
| carbon content: | from 0.3 to 12.0 wt. % |

The granules are used inter alia as a catalyst and catalyst support, in cosmetics for sun-protection formulations, in silicone rubber, in toner powders, in paints and inks, as grinding and polishing agents, as a raw material for the production of glass and ceramics.

10 Claims, 1 Drawing Sheet

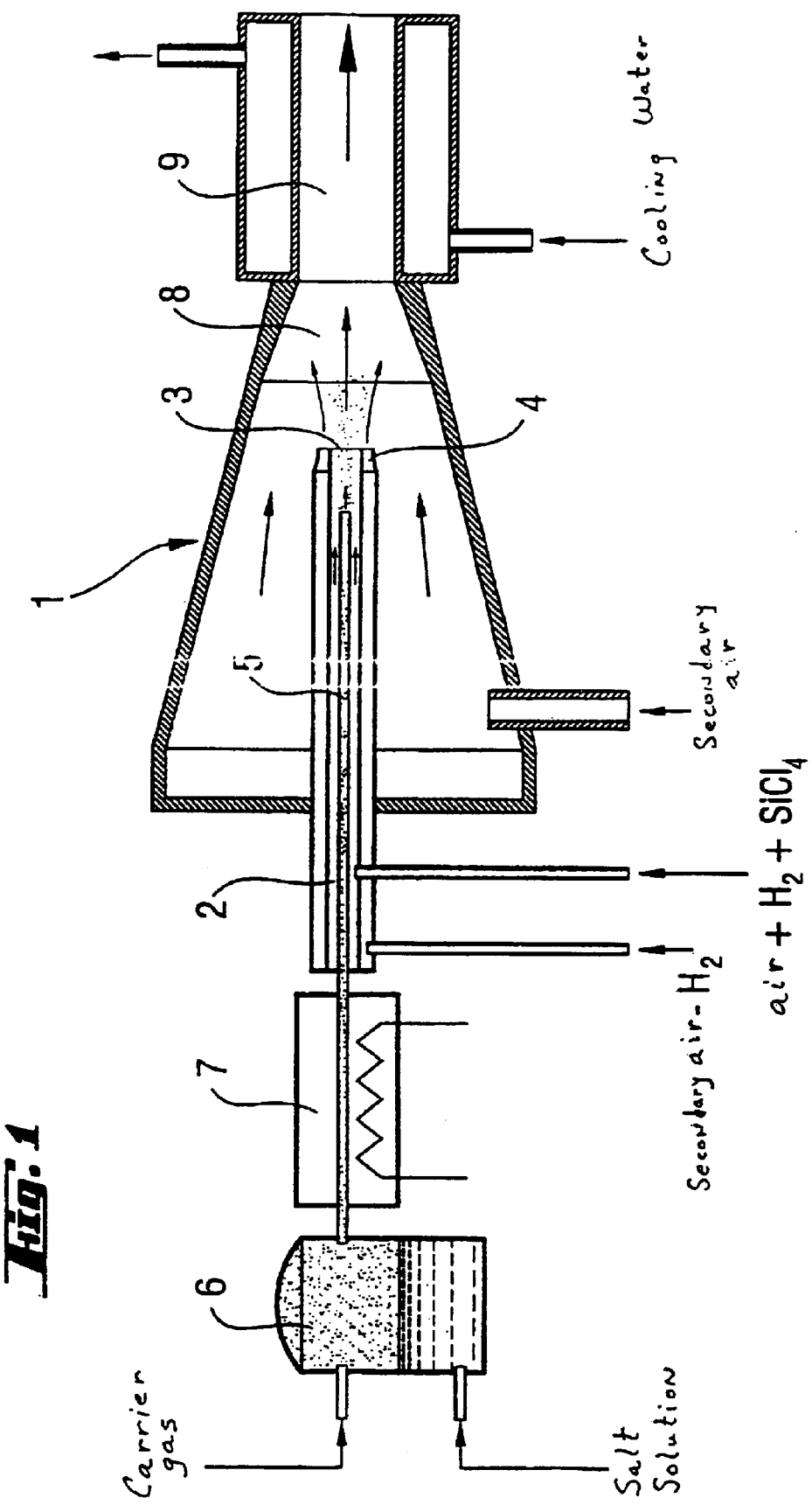

GRANULES BASED ON PYROGENICALLY PREPARED SILICON DIOXIDE DOPED WITH ALUMINUM OXIDE BY MEANS OF AN AEROSOL, METHOD OF PRODUCING SAME, AND USE THEREOF

INTRODUCTION AND BACKGROUND

The present invention relates to granules based on pyrogenically prepared silicon dioxide doped with aluminum oxide by means of an aerosol, to a method of producing them, and to their use.

It is known to prepare pyrogenic silicon dioxide (silica) from $SiCl_4$ by means of high temperature or flame hydrolysis (Ullmanns Enzyklopädie der technischen Chemie, 4th edition, Volume 21, page 464 (1982)).

Pyrogenic silicon dioxides are distinguished by the fact that they are extremely finely divided, have a high specific surface area (BET), very high purity, spherical particle form, and by the absence of pores. On account of those properties, pyrogenically prepared silicon dioxides are increasingly of interest as supports for catalysts (Dr. Koth et al., Chem. Ing. Techn. 52, 628 (1980). For that application, the pyrogenically prepared silicon dioxide is shaped by mechanical methods by means of, for example, tabletting machines.

From document EP 0 995 718 A1 there is known a pyrogenically prepared silicon dioxide in powder form doped with aluminum oxide by means of an aerosol. For the use of that silicon dioxide as a catalyst support, the object was to find a suitable granular form.

An object of the present invention was, therefore, to develop granules of pyrogenically prepared silicon dioxide doped with aluminum oxide by means of an aerosol which can be used as a catalyst support.

SUMMARY OF THE INVENTION

The above and other objects of the present invention can be achieved with spray dried granules based on pyrogenically prepared silicon dioxide doped with aluminum oxide by means of an aerosol, which granules have the following physico-chemical characteristic data:

| | |
|---|---|
| mean particle diameter: | from 10 to 150 µm |
| BET surface area: | from 25 to 100 m²/g |
| pH value: | from 3 to 6 |
| tamped density: | from 400 to 1200 g/l |

In a preferred embodiment of the invention, the granules can have the following physico-chemical characteristic data:

| | |
|---|---|
| mean particle diameter: | from 15 to 30 µm |
| BET surface area: | from 60 to 70 m²/g |
| pH value: | from 4 to 6 |
| tamped density: | from 400 to 650 g/l |

The granules according to the invention can be produced by dispersing in water pyrogenically prepared silicon dioxide doped with aluminum oxide by means of an aerosol, spray drying the dispersion, and optionally tempering the resulting granules at a temperature of from 150 to 1100° C. for a period of from 1 to 8 hours.

The pyrogenically prepared silicon dioxide doped with aluminum oxide by means of an aerosol may be a pyrogenically prepared silicon dioxide doped with aluminum oxide by means of an aerosol in which the base component is a silicon dioxide that has been prepared pyrogenically in the manner of flame oxidation or, preferably, of flame hydrolysis and that is doped with a doping component of from $1.10^{-4}$ and up to 20 wt. %, the doping amount preferably being in the range from 1 to 10,000 ppm and the doping component being a salt or a salt mixture of aluminum or a suspension of an aluminum compound or of metallic aluminum or mixtures thereof, the BET surface area of the doped oxide being from 5 to 600 m²/g, preferably in the range from 40 to 100 m²/g.

The silicon dioxide according to the invention can have a DBP number of less than 100 g/100 g.

The pyrogenically prepared silicon dioxide doped with aluminum oxide by means of an aerosol can be prepared by feeding an aerosol into a flame such as is used for the pyrogenic preparation of silicon dioxide in the manner of flame oxidation or, preferably, of flame hydrolysis, mixing the aerosol homogeneously with the gas mixture of the flame oxidation or flame hydrolysis before the reaction, then allowing the aerosol/gas mixture to react to completion in the flame and separating the resulting pyrogenically prepared silicon dioxide doped with aluminum oxide from the gas stream in a known manner, there being used to produce the aerosol an aqueous solution containing salts or salt mixtures of aluminum or the metal itself in dissolved or suspended form or mixtures thereof, the aerosol being produced by atomization by means of a two-component nozzle or by a different method of aerosol production, preferably by means of an aerosol generator by ultrasonic atomisation.

There may be used as salts: $AlCl_3$, $Al_2(SO_4)_3$, $Al(NO_3)_3$.

The methods of flame hydrolysis for the preparation of pyrogenic oxides and also for the preparation of silicon dioxide (silica) are known from Ullmanns Enzyklopädie der technischen Chemie, 4th edition, Volume 21, page 464.

The invention also provides granules based on pyrogenically prepared silicon dioxide doped with aluminum oxide by means of an aerosol, which granules have the following physico-chemical characteristic data:

| | |
|---|---|
| mean particle diameter: | from 10 to 160 µm |
| BET surface area: | from 15 to 100 m²/g |
| pH value: | from 3 to 9 |
| tamped density: | from 400 to 1200 g/l |
| carbon content: | from 0.3 to 12.0 wt. % |

BRIEF DESCRIPTION OF DRAWING

The present invention will be further understood with reference to the accompanying drawing which is a schematic representation of an apparatus used to carry out the present invention.

DETAILED DESCRIPTION OF INVENTION

The granules according to the invention can be produced by dispersing in water pyrogenically prepared silicon dioxide doped with aluminum dioxide by means of an aerosol, spray drying the dispersion, and optionally tempering the resulting granules at a temperature of from 150 to 1000° C. for a period of from 1 to 8 hours and then carrying out silanization.

Halosilanes, alkoxysilanes, silazanes and/or siloxanes may be used for the silanization.

The following substances in particular may be used as halosilanes:

a) organosilanes of the $(RO)_3Si(C_nH_{2n+1})$ and $(RO)_3Si(C_nH_{2n-1})$ type
   R=alkyl, such as, for example, methyl, ethyl, n-propyl, isopropyl, butyl
   n=from 1 to 20 b) organosilanes of the $R'_x(RO)_ySi(C_nH_{2n+1})$ and $R'_x(RO)_ySi(C_nH_{2n-1})$ type
   R=alkyl, such as, for example, methyl, ethyl, n-propyl, isopropyl, butyl
   R'=alkyl, such as, for example, methyl, ethyl, n-propyl, isopropyl, butyl
   R'=cycloalkyl
   n=from 1 to 20
   x+y=3
   x=1,2
   y=1,2 c) haloorganosilanes of the $X_3Si(C_nH_{2n+1})$ and $X_3Si(C_nH_{2n-1})$ type
   X=Cl, Br
   n=from 1 to 20 d) haloorganosilanes of the $X_2(R')Si(C_nH_{2n+1})$ and $X_2(R')Si(C_nH_{2n-1})$ type
   X=C, Br
   R'=alkyl, such as, for example, methyl, ethyl, n-propyl, isopropyl, butyl
   R'=cycloalkyl
   n=from 1 to 20 e) haloorganosilanes of the $X(R')_2Si(C_nH_{2n+1})$ and $X(R')_2Si(C_nH_{2n-1})$ type
   X=Cl, Br
   R'=alkyl, such as, for example, methyl, ethyl,
   R'=cycloalkyl
   n-propyl, isopropyl, butyl
   n=from 1 to 20 f) organosilanes of the $(RO)_3Si(CH_2)_m$—R' type
   R=alkyl, such as methyl, ethyl, propyl
   m=0, from 1 to 20
   R'=methyl, aryl (for example —$C_6H_5$, substituted phenyl radicals)
      —$C_4F_9$, $OCF_2$—CHF—$CF_3$, —$C_6F_{13}$, —O—$CF_2$—$CHF_2$
      —$NH_2$, —$N_3$, —SCN, —CH=$CH_2$, —NH—$CH_2$—$CH_2$—$NH_2$,
      —N—$(CH_2$—$CH_2$—$NH_2)_2$
      —$OOC(CH_3)C$=$CH_2$
      —$OCH_2$—CH(O)$CH_2$
      —NH—CO—N—CO—$(CH_2)_5$
      —NH—COO—$CH_3$, —NH—COO—$CH_2$—$CH_3$,
      —NH—$(CH_2)_3Si(OR)_3$
      —$S_x$—$(CH_2)_3Si(OR)_3$
      —SH
      —NR'R"R'"(R'=alkyl, aryl; R"=H, alkyl, aryl; R'"=H, alkyl, aryl, benzyl,
      $C_2H_4NR""R""'$ wherein R""=H, alkyl and R""'=H, alkyl)

g) organosilanes of the $(R")_x(RO)_ySi(CH_2)_m$—R' type
   R"=alkyl x+y=2
   =cycloalkyl x=1,2
   y=1,2
   m=0, from 1 to 20
   R'=methyl, aryl (for example —$C_6H_5$, substituted phenyl radicals)
      —$C_4F_9$, —$OCF_2$—CHF-$CF_3$, —$C_6F_{13}$, —O—$CF_2$—$CHF_2$
      —$NH_2$, —$N_3$, —SCN, —CH=$CH_2$, —NH—$CH_2$—$CH_2$—$NH_2$,
      —N—$(CH_2$—$CH_2$—$NH_2)_2$
      —$OOC(CH_3)C$=$CH_2$
      —$OCH_2$—CH(O)$CH_2$
      —NH—CO—N—CO—$(CH_2)_5$
      —NH—COO—$CH_3$, —NH—COO—$CH_2$—$CH_3$,
      —NH—$(CH_2)_3Si(OR)_3$
      —$S_x$—$(CH_2)_3Si(OR)_3$
      —SH—NR'R"R'"(R'=alkyl, aryl; R"=H, alkyl, aryl; R'"=H, alkyl, aryl, benzyl,
      $C_2H_4NR""R""'$ wherein R""=H, alkyl and R""'=H, alkyl)

h) haloorganosilanes of the $X_3Si(CH_2)_m$—R' type
   X=Cl, Br
   m=0, from 1 to 20
   R'=methyl, aryl (for example —$C_6H_5$, substituted phenyl (sic) radicals)
      —$C_4F_9$, —$OCF_2$—CHF—$CF_3$, —$C_6F_{13}$, —O—$CF_2$—$CHF_2$
      —$NH_2$, —$N_3$, —SCN, —CH=$CH_2$,
      —NH—$CH_2$—$CH_2$—$NH_2$
      —N—$(CH_2$—$CH_2$—$NH_2)_2$
      —$OOC(CH_3)C$=$CH_2$
      —$OCH_2$—CH(O)$CH_2$
      —NH—CO—N—CO—$(CH_2)_5$
      —NH—COO—$CH_3$, —NH—COO—$CH_2$—$CH_3$,
      —NH—$(CH_2)_3Si(OR)_3$
      —$S_x$—$(CH_2)_3Si(OR)_3$
      —SH i) haloorganosilanes of the $(R)X_2Si(CH_2)_m$—R' type
   X=Cl,Br
   R=alkyl, such as methyl, ethyl, propyl
   m=0, from 1 to 20
   R'=methyl, aryl (e.g. —$C_6H_5$, substituted phenyl radicals)
      —$C_4F_9$, —$OCF_2$—CHF—$CF_3$, —$C_6F_{13}$, —O—$CF_2$—$CHF_2$
      —$NH_2$, —$N_3$, —SCN, —CH=$CH_2$,—NH—$CH_2$—$CH_2$—$NH_2$,
      —N—$(CH_2$—$CH_2$—$NH_2)_2$
      —$OOC(CH_3)C$=$CH_2$
      —$OCH_2$—CH(O)$CH_2$
      —NH—CO—N—CO—$(CH_2)_5$
      —NH—COO—$CH_3$, —NH—COO—$CH_2$—$CH_3$,
      —NH—$(CH_2)_3Si(OR)_3$,
      wherein R may be methyl, ethyl, propyl, butyl
      —$S_x$—$(CH_2)_3Si(OR)_3$, wherein R may be methyl, ethyl, propyl, butyl
      —SH j) haloorganosilanes of the $(R)_2X Si(CH_2)_m$—R' type
   X=Cl, Br
   R=alkyl
   m=0, from 1 to 20
   R'=methyl, aryl (e.g. —$C_6H_5$, substituted phenyl radicals)
      —$C_4F_9$, —$OCF_2$—CHF—$CF_3$, —$C_6F_{13}$, —O—$CF_2$—$CHF_2$
      —$NH_2$, —$N_3$, —SCN, —CH=$CH_2$, —NH—$CH_2$—$CH_2$—$NH_2$,
      —N—$(CH_2$—$CH_2$—$NH_2)_2$ —OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
S$_x$—(CH$_2$)$_3$Si(OR)$_3$
—SH (k) silazanes of the

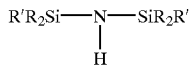

type
R=alkyl
R'=alkyl, vinyl (l) cyclic polysiloxanes of type D 3, D 4, D 5, wherein D 3, D 4 and D 5 are to be understood as meaning cyclic polysiloxanes having 3, 4 or 5 units of the —O—Si(CH$_3$)$_2$-type.

E.g. octamethylcyclotetrasiloxane D 4

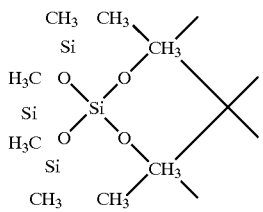

(m) polysiloxanes or silicone oils of type

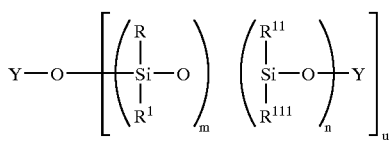

m=0, 1, 2, 3, . . . ∞
n=0, 1, 2, 3, . . . ∞
u=0, 1, 2, 3, . . . ∞
Y=CH3, H, CnH2n+1 n=from 1 to 20
Y=Si(CH3)3, Si(CH3)2H
Si(CH3)2OH, Si(CH3)2(OCH3)
Si(CH3)2(CnH2n+1) n=from 1 to 20
R=alkyl, such as C$_n$H$_{2n+1}$, wherein n=from 1 to 20, aryl, such as phenyl and substituted phenyl radicals, (CH$_2$)$_n$—NH$_2$, H
R'=alkyl, such as C$_n$H$_{2n+1}$, wherein n=from 1 to 20, aryl, such as phenyl and substituted phenyl radicals, (CH$_2$)$_n$—NH$_2$, H
R'=alkyl, such as C$_n$H$_{2n+1}$, wherein n=from 1 to 20, aryl, such as phenyl and substituted phenyl radicals, (CH$_2$)$_n$—NH$_2$, H
R'=alkyl, such as C$_n$H$_{2n+1}$, wherein n=from 1 to 20, aryl, such as phenyl and substituted phenyl radicals, (CH$_2$)$_n$—NH$_2$, H The dispersion in water may have a concentration of pyrogenically prepared silicon dioxide doped with aluminum oxide by means of an aerosol of from 3 to 50 wt. %.

Organic auxiliary substances may be added to the dispersion in order to increase the stability of the dispersion and improve the particle morphology after spray drying.

The following auxiliary substances, for example, may be used:

polyalcohols, polyethers, fluorocarbon-based surfactants, alcohols.

The spray drying may be carried out at a temperature of from 200 to 600° C. Disk-type atomizers or nozzle-type atomizers may be used.

Tempering of the granules may be carried out either in a stationary mass, such as, for example, in chamber ovens, or in a moving mass, such as, for example, rotary driers.

The silanization may be carried out with the same halosilanes, alkoxysilanes, silazanes and/or siloxanes as described above, it being possible for the silanizing agent to be dissolved in an organic solvent, such as, for example, ethanol.

Silane Si 108 [$(CH_3O)_3SiC_8H_{17}$] trimethoxyoctylsilane can preferably be used as the silanizing agent.

The silanization can be carried out by spraying the granules with the silanizing agent at room temperature and then subjecting the mixture to heat treatment at a temperature of from 100 to 400° C. for a period of from 1 to 6 hours.

An alternative method of silanizing the granules can be carried out by treating the granules with the silanizing agent in vapour form and then subjecting the mixture to heat treatment at a temperature of from 200 to 800° C. for a period of from 0.5 to 6 hours.

Heat treatment may take place under a protecting gas, such as, for example, nitrogen.

The silanization can be carried out continuously or batchwise in heatable mixers and driers with spray devices. Suitable apparatuses may be, for example: ploughshare mixers, plate, fluidised bed or moving bed driers.

By varying the substances used and the conditions during spraying, tempering and silanization, it is possible to alter the physico-chemical parameters of the granules, such as the specific surface area, the particle size distribution, the tamped density and the pH value, within the indicated limits.

The granules according to the invention based on pyrogenically prepared silicon dioxide doped with aluminum oxide by means of an aerosol have the following advantages:

a) The flow behaviour and hence the handling and processability are substantially better than in the case of pyrogenically prepared silicon dioxide, doped with aluminum oxide by means of an aerosol, that has not been spray dried.
b) Incorporation into organic systems is easier.
c) Dispersion is simpler.
d) No additional auxiliary substances are required for the granulation.
e) As compared with pyrogenically prepared silicon dioxide, doped with aluminum oxide by means of an aerosol, that has not been spray dried, which does not have a defined agglomerate size, the granules according to the invention based on pyrogenically prepared silicon dioxide doped with aluminum oxide by means of an aerosol have a defined particle size.
f) The granules according to the invention based on pyrogenically prepared silicon dioxide doped with aluminum oxide by means of an aerosol permit dust-free handling.
g) Owing to the high tamped density, a lower outlay in terms of packaging is required for transportation.
h) The granules according to the invention based on pyrogenically prepared silicon dioxide doped with aluminum oxide by means of an aerosol can be used as a catalyst support.
i) Pyrogenically prepared silicon dioxide, doped with aluminum oxide by means of an aerosol, that has not been spray dried is not suitable for that purpose because it is, for example, discharged from the fluidized bed.

The granules according to the invention can be used as catalysts and supports for catalysts, as well as in cosmetics, as protection against the sun, in silicone rubber, in toner powders, in paints and inks, as grinding and polishing agents, as a raw material for the production of glass and ceramics.

The granules can be modified in various ways.

Examples for the modification are:

The incorporation of cations, such as, for example, $H^+$, $Cs^+$, rare earth metal or noble metal cations.

Incorporation of metals or metal oxides by reaction with suitable precursor molecules, such as, for example, $TiCl_4$, $TiBr_4$, $Ti(OEt)_4$, $TiCp_2Cl_2$ (Cp=cyclopentadienyl), $Mn_2(CO)_{10}$, $Fe(CO)_5$.

Incorporation of noble metals or metal oxides by impregnation with solutions of the metal or noble metal salts.

The granules according to the invention can be used as catalysts and catalyst supports, for example for the following catalytic reactions:

The oxyfunctionalization of hydrocarbons, the oxidation of olefins to epoxides with hydrogen peroxide, alkyl or aryl hydroperoxides, such as, for example, tert.-butyl hydroperoxide or phenylethyl hydroperoxide ($C_6H_5CH_2CH_2OOH$) and/or oxygen, alkylations of aromatic compounds, hydrogenations, dehydrogenations, hydrations, dehydrations, isomerizations, addition and elimination reactions, nucleophilic and electrophilic substitution reactions, hydroxylations of aromatic compounds and heteroaromatic compounds, epoxide-aldehyde rearrangements, amminations, ammoximations, polymerization reactions, esterification and etherification reactions, as well as catalytic reactions of waste gases and flue gases, or nitric oxide removal.

The granules according to the invention are additionally suitable as carriers for colorants, fragrances and active ingredients.

EXAMPLES

The pyrogenically prepared silicon dioxide, doped with aluminum oxide by means of an aerosol, that can be used according to the invention, and the process for its preparation, are explained and described in greater detail with reference to FIG. 1 and the Examples which follow.

FIG. 1 shows a diagrammatic view of the doping apparatus. The core element of the apparatus is a burner of known construction for the production of pyrogenic oxides.

The burner 1 consists of the central pipe 2, which opens into the nozzle 3, from which the main gas stream flows into the burner chamber, where it is burnt. The nozzle 3 is surrounded by the ring nozzle 4, from which (ring or secondary) hydrogen flows.

In the central pipe 2 there is the axial pipe 5, which ends a few centimeters before the nozzle of the central pipe 2. The aerosol is fed into the axial pipe 5.

The aerosol, which consists of an aqueous aluminum chloride solution, is produced in the aerosol generator 6 (ultrasonic atomizer).

The aluminum chloride/water aerosol produced in the aerosol generator 6 is conveyed by means of a slight carrier gas stream through the heating zone 7, in which the water that has been carried along evaporates, small salt crystals in finely divided form remaining behind in the gas phase.

Example 1

Preparation of a Pyrogenically Prepared Silicon Dioxide, Doped with Aluminum Oxide by Means of an Aerosol, Having a Low Bet Surface Area 5.25 kg/h of $SiCl_4$ are vaporized at approximately 130° C. and passed into the central pipe 2 of the burner 1. 3.47 $Nm^3$/h of (primary) hydrogen and 3.76 $Nm^3$/h of air are additionally fed into the central pipe 2. 0.95 $Nm^3$/h of oxygen are additionally added to that mixture.

The gas mixture flows out of the nozzle 3 of the burner 1 and bums in the burner chamber and the water-cooled flame tube adjacent thereto.

0.5 $Nm^3$/h of (enveloping or secondary) hydrogen and 0.3 $Nm^3$/h of nitrogen are fed into the ring nozzle 4.

20 $Nm^3$/h of (secondary) air are additionally fed into the burner chamber.

The second gas stream flows from the axial pipe 5 into the central pipe 2.

The second gas stream consists of the aerosol, which is produced in the aerosol generator 6 by the ultrasonic atomization of $AlCl_3$ solution. The aerosol generator 6 atomises 460 g/h of 2.29% aqueous aluminum trichloride solution. The aluminum chloride aerosol is conveyed through the heated pipe with the aid of the carrier gas of 0.5 $Nm^3$/h of air, the aqueous aerosol changing at temperatures of about 180° C. into a gas and a salt crystal aerosol.

The temperature of the gas mixture ($SiCl_4$/air/hydrogen, water-aerosol) at the mouth of the burner is 156° C.

The reaction gases and the pyrogenic silica doped with aluminum oxide by means of an aerosol are drawn through the cooling system by application of a low pressure. The particle gas stream is thereby cooled to approximately from 100 to 160° C. The solid material is separated from the waste gas stream in a cyclone.

The pyrogenically prepared silicon dioxide doped with aluminum oxide by means of an aerosol is obtained in the form of a finely divided white powder.

In a further step, any hydrochloric acid residues still adhering to the silica are removed at elevated temperature by treatment with air containing water vapour.

The BET surface area of the pyrogenic silica doped with aluminum oxide is 55 $m^2$/g.

The preparation conditions are summarized in Table 1. Further analytical data for the silicon dioxide that can be used according to the invention are given in Table 2.

Example 2

Preparation of a Pyrogenically Prepared Silicon Dioxide, Doped with Aluminum Oxide by Means of an Aerosol, Having a High Bet Surface Area 44 kg/h of $SiCl_4$ are vaporized at approximately 130° C. and passed into the central pipe 2 of the burner 1 of known construction. 3.15 $Nm^3$/h of (primary) hydrogen and 8.2 $Nm^3$/h of air are additionally fed into the central pipe 2.

The gas mixture flows out of the nozzle 3 of the burner 1 and burns in the burner chamber and the water-cooled flame tube adjacent thereto.

0.5 $Nm^3$/h of (enveloping or secondary) hydrogen and 0.3 $Nm^3$/h of nitrogen are fed into the ring nozzle 4.

12 $Nm^3$/h of (secondary) air are additionally fed into the burner chamber.

The second gas stream flows from the axial pipe 5 into the central pipe 2.

The second gas stream consists of the aerosol, which is produced in the separate atomising unit 6 by the ultrasonic atomization of $AlCl_3$ solution. The aerosol generator 6 atomises 450 g/h of 2.29% aqueous aluminum trichloride solution. The aluminum chloride aerosol is conveyed through the heated pipe with the aid of the carrier gas of 0.5 Nm³/h of air, the aqueous aerosol changing at temperatures of about 180° C. into a gas and a salt crystal aerosol.

The temperature of the gas mixture (SiCl₄/air/hydrogen, water-aerosol) at the mouth of the burner is 180° C.

The reaction gases and the pyrogenically prepared silicon dioxide doped with aluminum oxide by means of an aerosol are drawn through a cooling system by application of a low pressure. The particle gas stream is thereby cooled to approximately from 100 to 160° C. The solid material is separated from the waste gas stream in a cyclone.

The pyrogenically prepared silicon dioxide doped with aluminum oxide by means of an aerosol is obtained in the form of a finely divided white powder. In a further step, any hydrochloric acid residues still adhering to the silica are removed at elevated temperature by treatment with air containing water vapour.

The BET surface area of the pyrogenically prepared silicon dioxide doped with aluminum oxide by means of an aerosol is 203 m²/g.

The preparation conditions are given in Table 1. Further analytical data for the silicon dioxide that can be used according to the invention are given in Table 2.

Experimental conditions in the preparation of pyrogenically prepared silicon dioxide doped with aluminum oxide are shown in Table 1.

in g/cm³. Owing to the very low tamped density of pyrogenic oxides, however, the value is given herein in g/l. Furthermore, drying and sieving as well as repetition of the tamping operation are not carried out.

Devices for the Tamped Density Determination
tamping volumeter
measuring cylinder, 250 ml
laboratory balance (readability 0.01 g)

Carrying Out the Tamped Density Determination

200±10 ml of granules are introduced into the measuring cylinder of the tamping volumeter so that no hollow spaces remain and the surface is horizontal.

The weight of the introduced sample is determined to an accuracy of 0.01 g. The measuring cylinder with the sample is placed in the measuring-cylinder holder of the tamping volumeter and tamped 1250 times.

The volume of the tamped pyrogenic oxide is read off to an accuracy of 1 ml.

Evaluation of the Tamped Density Determination $$\text{tamped density (g/l)} = \frac{\text{weighed portion in g} \times 1000}{\text{read-off volume in ml}}$$

The pH value is determined in a 4% aqueous dispersion, in the case of hydrophobic granules in water:methanol 1:1.

TABLE 1

| No. | SiCl₄ kg/h | Primary air Nm³/h | Core O₂ Nm³/h | Sec. air Nm³/h | Core H₂ Nm³/h | Enveloping H₂ Nm³/h | Enveloping N₂ Nm³/h | Gas temp. ° C. | Salt solution | Aerosol amount kg/h | Air aerosol Nm³/h | BET m²/g |
|---|---|---|---|---|---|---|---|---|---|---|---|---|
| 1 | 5.25 | 3.76 | 0.95 | 20 | 3.47 | 0.5 | 0.3 | 156 | 2.29% aqueous AlCl₃ | 0.46 | 0.5 | 55 |
| 2 | 4.44 | 8.2 | 0 | 12 | 3.15 | 0.5 | 0.3 | 180 | 2.29% aqueous AlCl₃ | 0.45 | 0.5 | 203 |

Explanation:
Primary air = amount of air in the central pipe; Sec. air = secondary air; Core H₂ = hydrogen in the central pipe; Gas temp. = gas temperature at the nozzle of the central pipe; Aerosol amount = mass flow of the salt solution converted into aerosol form; Air aerosol = amount of carrier gas (air) for the aerosol;

TABLE 2

Analytical data of the samples obtained according to Examples 1 to 2

| | BET m²/g | pH value 4% sus. | Tamped density g/l | DBP absorption g/100 g | Al₂O₃ content wt. % | SiO₂ content wt. % | Chloride content ppm |
|---|---|---|---|---|---|---|---|
| Example No. 1 | 55 | 4.39 | 94 | 81 | 0.187 | 99.79 | 89 |
| Example No. 2 | 203 | 4.15 | 24 | 326 | 0.27 | 99.67 | |
| In comparison therewith | | | | | | | |
| Aerosil OX 50 | 50 | 3.8 to 4.8 | 130 | ca. 160 | <0.08 | >99.8 | <250 |

Explanation: pH 4% sus. = pH value of the four percent aqueous suspension

The physico-chemical characteristic data are determined using the following measuring methods:

The BET surface area is determined according to DIN 66 131 with nitrogen.

Determination of the tamped density following DIN ISO 787/XI

Principles of the Tamped Density Determination

The tamped density (formerly tamped volume) is equal to the quotient of the weight and the volume of a powder after tamping in a tamping volumeter under given conditions. According to DIN ISO 787/XI, the tamped density is given Reagents for the pH Value Determination
distilled or demineralized water, pH>5.5
methanol, analytically pure
buffer solutions pH 7.00 pH 4.66
Devices for the pH Value Determination
laboratory balance, (readability 0.1 g)
glass beaker, 250 ml
magnetic stirrer
magnetic rod, length 4 cm
combined pH electrode
pH-measuring device Dispensette, 100 ml Working Specification for Determining the pH Value The determination is carried out following DIN/ISO 787/IX:

| Calibration: | Before the pH value is measured, the measuring device is calibrated using the buffer solutions. If a plurality of measurements is carried out in succession, it is sufficient to calibrate the device once. |
|---|---|

4 g of hydrophobic granules are made into a paste in a 250 ml glass beaker with 48 g (61 ml) of methanol, and the suspension is diluted with 48 g (48 ml) of water and stirred for five minutes with a magnetic stirrer (speed approx. 1000 min$^{-1}$), with the pH electrode immersed. After stopping the stirrer, the pH value is read off after the mixture has been left to stand for one minute. The result is given to one decimal place.

Determination of the Loss on Drying

In contrast to the weighed portion of 10 g mentioned in DIN ISO 787 II, a weighed portion of 1 g is used for determining the loss on drying.

The cover is put on before cooling. A second drying operation is not carried out.

Approximately 1 g of the sample is weighed to an accuracy of 0.1 mg, avoiding the development of dust, into a weighing pan, having a ground-glass cover, which has been dried at 105° C., and drying is carried out for two hours at 105° C. in a drying cabinet. After cooling, with the cover in place, in a desiccator over blue gel, the sample is re-weighed.

$$\% \text{ loss on drying at } 105° \text{ C.} = \frac{\text{weight loss in g}}{\text{weighed portion in g}} \times 100$$

The result is given to one decimal place.

Determination of the Loss on Ignition (2 h at 1000° C., Based on the Dried Substance (2 h at 105° C.)

Principles for Determining the Loss on Ignition

Determination of the loss on ignition is carried out at 1000° C. At that temperature, the chemically bonded water escapes in addition to the physically bonded water.

Devices for Determining the Loss on Ignition porcelain crucible with crucible lid muffle furnace analytical balance (readability 0.1 mg)

desiccator

Carrying Out the Determination of the Loss on Ignition

In contrast to DIN 55 921, from 0.3 to 1 g of the substance, which has not been pre-dried, is weighed to an accuracy of 0.1 mg into a porcelain crucible, having a crucible lid, which has previously been heated to red-hot, and the sample is ignited for 2 hours at 1000° C. in a muffle furnace.

Pulverization is carefully to be avoided. It has proved advantageous for the weighed samples to be placed in the muffle furnace while it is still cold.

By heating up the furnace slowly, more considerable air turbulence in the porcelain crucibles is avoided.

When a temperature of 1000° C. has been reached, ignition is continued for a further 2 hours. The crucible is then covered with a crucible lid, and the crucible is cooled in a desiccator over blue gel. Additionally the weight loss is determined.

Evaluation of the Determination of the Loss on Ignition

Since the loss on ignition is based on the sample dried for 2 hours at 105° C., the following calculation formula is obtained:

$$\% \text{ loss on ignition} = \frac{m_0 \times \frac{100-LD}{100} - m_1}{m_0 \times \frac{100-LD}{100}} \times 100$$

$m_0$ = weighed portion (g)

LD = loss on drying (%)

$m_1$ = weight of the ignited sample (g)

The result is given to one decimal place.

Production of the Granules According to the Invention

The pyrogenically prepared silicon dioxide doped with aluminum oxide by means of an aerosol is dispersed in demineralized water. A dispersing unit that operates according to the rotor/stator principle is used. The resulting dispersions are spray dried. The finished product is separated off over a filter or a cyclone.

Tempering of the spray granules may take place in muffle furnaces.

The data for the production of the granules according to the invention are given in Table 3.

The data for the resulting granules are given in Table 4.

The spray-dried and optionally tempered granules are placed in a mixer for silanization and sprayed, with intensive mixing, optionally first with water and then with the silanizing agent.

When the spraying is complete, mixing is continued for a further 15 to 30 minutes and then tempering is carried out for from 1 to 4 hours at from 100 to 400° C.

The water used may be acidified with an acid, for example hydrochloric acid, to a pH value of from 7 to 1. The silanizing agent used may be dissolved in a solvent, such as, for example, ethanol.

TABLE 3

Data for the spray drying of aqueous VP 3375 dispersions

| Test no. | Solids content oxide/H$_2$O [g/l] | Atomisation with | Atomising disk speed [rpm] | Operating temperature [° C.] | Waste air temperature [° C.] | Spray drier |
|---|---|---|---|---|---|---|
| 1 | 150 | disk | 20,000 | 380 | 105 | Niro SD 12.5 |
| 2 | 150 | disk | 10,000 | 380 | 105 | Niro SD 12.5 |
| 3 | 150 | two-component nozzle | — | 260 | 105 | Anhydro Compakt |

TABLE 3-continued

Data for the spray drying of aqueous VP 3375 dispersions

| Test no. | Solids content oxide/H$_2$O [g/l] | Atomisation with | Atomising disk speed [rpm] | Operating temperature [° C.] | Waste air temperature [° C.] | Spray drier |
|---|---|---|---|---|---|---|
| 4 | 200 | two-component nozzle | — | 260 | 105 | Anhydro Compakt |
| 5 | 250 | two-component nozzle | — | 260 | 105 | Anhydro Compakt |
| 6 | 300 | two-component nozzle | — | 260 | 105 | Anhydro Compakt |
| 7 | 350 | two-component nozzle | — | 260 | 105 | Anhydro Compakt |
| 8 | 450 | two-component nozzle | — | 260 | 105 | Anhydro Compakt |
| 9 | 600 | two-component nozzle | — | 260 | 105 | Anhydro Compakt |
| 10 | 600 | two-component nozzle | — | 380 | 110 | Niro SD 12.5 |
| 11 | 600 | two-component nozzle | — | 420 | 106 | Niro SD 12.5 |
| 12 | 600 | disk | 20,000 | 380 | 107 | Niro SD 12.5 |

TABLE 4

Physico-chemical data of spray-dried products

| Test no. | Tamped density [g/l] | Loss on drying [%] | Loss on ignition [%] | pH value | Spec. surface area (BET)[m$^2$/g] | d$_{50}$ value (Cilas)[μm] |
|---|---|---|---|---|---|---|
| 1 | 527 | 0.3 | 0.2 | 4.7 | 63 | 18 |
| 2 | 536 | 0.6 | 0.3 | 5.7 | 63 | 24 |
| 3 | 455 | 0.8 | 0.3 | 4.8 | 63 | 19 |
| 4 | 504 | 0.5 | 0.5 | 5.5 | 63 | 21 |
| 5 | 532 | 0.5 | 0.5 | 4.5 | 62 | 26 |
| 6 | 536 | 0.3 | 0.5 | 4.8 | 63 | 22 |
| 7 | 559 | 0.4 | 0.6 | 5.1 | 62 | 25 |
| 8 | 550 | 0.9 | 0.2 | 5.0 | 62 | 23 |
| 9 | 601 | 0.3 | 0.5 | 5.1 | 62 | 21 |
| 10 | 603 | 0.4 | 0.5 | 5.7 | 63 | 18 |
| 11 | 618 | 0.3 | 0.6 | 5.1 | 63 | 24 |
| 12 | 578 | 0.2 | 0.5 | 5.9 | 65 | 23 |

TABLE 5

Surface modification of the spray-dried products*

| Test no. | Surface-modifying agent(SM) | Parts SM/100 parts oxide | Parts H$_2$O/100 parts oxide | Tempering temperature [° C.] | Tempering time [h] |
|---|---|---|---|---|---|
| 1 | A | 10 | 0 | 370 | 2 |
| 2 | B | 8 | 2 | 120 | 2 |
| 3 | C | 10 | 2 | 140 | 3 |
| 4 | D | 7 | 1 | 140 | 2 |
| 5 | E | 8 | 1 | 140 | 2 |
| 6 | F | 6 | 1 | 130 | 2 |

*Example 11 from Table 4 was used
A = dimethylpolysiloxane
B = 3-methacryloxypropyltrimethoxysilane
C = hexamethyldisilazane
D = hexadecyltrimethoxysilane
E = octyltrimethoxysilane
F = aminopropyltriethoxysilane

TABLE 6

Physico-chemical data of the surface-modified products of Table 5

| Test no. | Tamped density [g/l] | pH value | Loss on drying [%] | Loss on ignition [%] | C content [%] |
|---|---|---|---|---|---|
| 1 | 655 | 5.2 | 0.3 | 0.3 | 0.4 |
| 2 | 642 | 6.8 | 0.3 | 4.0 | 2.5 |
| 3 | 637 | 7.2 | 0.4 | 1.0 | 0.9 |
| 4 | 645 | 7.5 | 1.0 | 4.3 | 3.9 |
| 5 | 642 | 7.4 | 1.9 | 3.2 | 2.9 |
| 6 | 635 | 10.0 | 0.4 | 3.7 | 0.9 |

Further modifications and variations of the invention will be apparent to those skilled in the art from the foregoing and are intended to be encompassed by the claims appended hereto.

German priority application 101 23 950.5 of May 17, 2001 is relied on and incorporated herein by reference.

We claim:

1. Granules of pyrogenically prepared silicon dioxide doped with aluminum oxide by means of an aerosol, which granules have the following physico-chemical characteristic data:

| | |
|---|---|
| mean particle diameter: | from 10 to 150 μm |
| BET surface area: | from 25 to 100 m²/g |
| pH value: | from 3 to 6 |
| tamped density: | from 400 to 1200 g/l. |

2. The granules according to claim 1 with the following physico-chemical properties:

| | |
|---|---|
| mean particle diameter: | from 15 to 30 μm |
| BET surface area: | from 60 to 70 m²/g |
| pH value: | from 4 to 6 |
| tamped density: | from 400 to 650 g/l. |

3. The method of producing the granules according to claim 1, comprising dispersing pyrogenically prepared silicon dioxide doped with aluminum oxide in water by an aerosol to form a dispersion, spray drying the dispersion to thereby obtain granules, optionally tempering said granules at a temperature of from 150 to 1100° C. for a period of from 1 to 8 hours.

4. The method according to claim 3, wherein said silicon dioxide is a pyrogenically prepared silicon dioxide doped with aluminum oxide by means of an aerosol, in which the base component is a silicon dioxide that has been prepared pyrogenically by flame oxidation or by flame hydrolysis, doped with a doping component of from $1·10^{-4}$ and up to 20 wt. %, the doping amount being in the range from 1 to 10,000 ppm and the doping component being a salt or a salt mixture of aluminum or a suspension of an aluminum compound or of metallic aluminum or mixtures thereof, the BET surface area of the doped oxide being from 5 to 600 m²/g.

5. A method of producing the granules according to claim 1, comprising feeding an aerosol into a flame used for the pyrogenic preparation of silicon dioxide in flame oxidation or, flame hydrolysis, mixing the aerosol homogeneously with a gas mixture of the flame oxidation or flame hydrolysis before the reaction, then allowing the aerosol/gas mixture to react to completion in the flame and separating the resulting pyrogenically prepared silicon dioxide doped with aluminum oxide from the gas stream, said aerosol being an aqueous solution containing salts or salt mixtures of aluminum or the metal itself dissolved or suspended form or mixtures thereof.

6. A method of producing the granules according to claim 5, comprising dispensing pyrogenically prepared silicon dioxide doped with aluminum oxide by means of an aerosol in water, to form a dispersion, spray drying the dispersion, and optionally tempering the resulting granules at a temperature of from 150 to 1100° C. for a period of from 1 to 8 hours and then silanizing said granules.

7. The method according to claim 6 wherein silanizing is carried out with halosilane, alkoxysilane, silazane and/or siloxane optionally dissolved in an organic solvent.

8. The method according to claim 7 wherein silanizing is carried out by spraying the granules with the silanizing agent at room temperature and then subjecting the mixture to heat treatment at a temperature of from 100 to 400° C. for a period of from 1 to 6 hours.

9. The method according to claim 7 where silanizing is carried out by treating the granules with the silanizing agent in vapour form and then subjecting the mixture to heat treatment at a temperature of from 200 to 800° C. for a period of from 0.5 to 6 hours.

10. Granules of pyrogenically prepared silicon dioxide doped with aluminum oxide by means of an aerosol, which granules have the following physico-chemical characteristic data:

| | |
|---|---|
| mean particle diameter: | from 10 to 160 μm |
| BET surface area: | from 15 to 100 m²/g |
| pH value: | from 3 to 9 |
| tamped density: | from 400 to 1200 g/l |
| carbon content: | from 0.3 to 12.0 wt. %. |

* * * * *